United States Patent [19]

Wiss

[11] 4,016,754
[45] Apr. 12, 1977

[54] TESTING DEVICE FOR WHEELED AUTOMOTIVE VEHICLES

[76] Inventor: John W. Wiss, 3316 Brookdale Drive, Pittsburgh, Pa. 15241

[22] Filed: July 30, 1974

[21] Appl. No.: 493,168

Related U.S. Application Data

[63] Continuation-in-part of Ser. No. 280,865, Aug. 15, 1972, Pat. No. 3,826,129.

[52] U.S. Cl. .............................. 73/117.3; 73/133 R
[51] Int. Cl.² ......................................... G01M 15/00
[58] Field of Search ............ 73/8, 117, 133 R, 134, 73/141 R, 146

[56] References Cited

UNITED STATES PATENTS

| 479,979 | 8/1892 | Glenn | 239/202 |
|---|---|---|---|
| 1,513,430 | 10/1924 | Scott | 73/117 |
| 2,576,544 | 11/1951 | Smith | 73/117 X |

Primary Examiner—Jerry W. Myracle

[57] ABSTRACT

An improved testing device for operating a wheeled automotive vehicle under power while it is standing still. This type of operation is desired in such endeavors as service diagnosis, measurement of exhaust emissions, and laboratory testing. In this device, power is absorbed by friction between the vehicle's driving wheels and a stationary portion of the testing device. Overheating of the tire is prevented by interposing a fluid such as water or air at the juncture of the tire and the power-absorber, or otherwise cooling the power-absorber surface. Vehicular traction load, or tractive effort, may be adjusted by adjusting the contact forces between the tire and the power-absorber. Vehicular tractive effort may be measured as the thrust force applied by the tire to the power-absorber. Speed may be measured from the motion of the driving wheel. Power may be computed automatically to provide a continuous presentation of speed and horsepower to the test operator. This testing device is sometimes called a vehicular dynamometer or chassis dynamometer. It possesses many of the characteristics of traction or drawbar dynamometers, except that the vehicle remains essentially stationary.

17 Claims, 8 Drawing Figures

TESTING DEVICE FOR WHEELED AUTOMOTIVE VEHICLES

The present application is a continuation-in-part of my application Ser. No. 280,865, filed Aug. 15, 1972 now U.S. Pat. No. 3,826,129.

For many years, testing devices for automotive vehicles have been built and used to absorb and measure the power from an automotive vehicle while the vehicle is simulating road loads or other operation and yet is standing still. These devices are sometimes called automotive vehicular dynamometers or, more often, chassis dynamometers. These devices have principally been used in the design and development of automotive equipment, and in its mechanical inspection and adjustment during service operations. They permit ready observation of and access to the vehicle being tested. This is particularly important when the observing or testing equipment is not portable and cannot readily accompany the vehicle during normal operation. A dynamometer is also useful in providing reproducible load conditions from one test to another. Road testing, in order to provide reproducible results, often requires the construction of expensive special roadways on professionally-operated proving grounds. This typically makes dynamometer testing quicker and less expensive than road testing. The Federal Procedure for automotive exhaust emissions testing, for example, specifies dynamometer testing. The machinery and inventions in this prior art have generally been pointed toward use by sophisticated technicians in the research & development, racing, and truck repair fields. The cost and skill requirements have been acceptable to that environment. In these prior-art dynamometers, power is generally transferred from the vehicle driving wheels to one or more rollers, which also may support the weight of the vehicle and sense its speed. The power received by the rollers is subsequently converted to heat in electrical, hydraulic, pneumatic, or friction devices. Power is customarily measured from roller torque and speed, although direct electrical and other measurement means have been used.

With the advent of large-volume testing of automobiles for service diagnostic and exhaust-emissions purposes there is a growing need for a dynamometer that can be operated by the average service technician, and provided to him at a relatively low cost. Cheapened versions of conventional dynamometers have not been very satisfactory, since they require essentially the same laboratory-technician level of skill and careful operation & maintenance.

The object of this invention, therefore, is to provide an automotive vehicular dynamometer that is satisfactory for service diagnostic and exhaust-emissions compliance testing, and other purposes, with inherent low cost and ease of use.

I have observed that automobile tires can spin on wet or otherwise cooled pavements, providing moderate levels of propulsive thrust with apparently negligible deterioration of the tire. Tire deterioration, according to published sources, only becomes rapid when the rubber temperature becomes high, such as greater than 250F. My observations and calculations indicate that several means of cooling are adequate to prevent spinning tire temperatures from exceeding such a level. For example, fluids such as water or air can be introduced into the space between tire and pavement and provide effective cooling. Thermally-conductive pavement plates with fluids such as water or air circulated to remove heat from them should also suffice. I have also noted that the friction force delivered by a spinning tire bears a reasonable proportionality to the amount of force applied perpendicularly by the wheel to the pavement. For similar conditions at the interface between the wheel and the pavement, doubling the weight carried by the wheel tends to double the restraining force required to oppose the tractive effort, F, in order to prevent forward motion of the vehicle. Similarly, cutting the weight in half tends to halve the required restraining force. The natural resilience of tires or springs can be used to facilitate control of tractive effort. Lifting a vehicle body or axle will result in decreasing the propulsive force (tractive effort) and lowering the body or axle will increase the tractive effort. Since most automobiles use springs between the axle and the body, the lifting and lowering of the body provides a very satisfactory method of adjusting the amount of tractive effort, without being overly sensitive to extraneous small disturbances. This is only one of several feasible methods of load adjustment. The resilience of tires can be similarly used, by lifting and lowering the axle or hub to decrease or increase the tractive effort load. Another method is to use pressurized cooling fluid between the tire and the pavement plate, increasing the wheel to plate clearance and decreasing the friction load as the fluid pressure increases. I have also observed that, in dynamic traction or drawbar dynamometer testing, on roadways or other test courses, the measurements of drawbar pull or tractive effort, F, can be made to reasonable precision and reproducibility with several types of instrumentation, principally spring gages, electrical resistance straingages, and hydrostatic drawbar gages. Measurements of speed, S, can be made by conventional speedometer means, utilizing the rotational speed of vehicular driving components. For greater accuracy, laboratory drawbar dynamometer test course speeds are customarily measured by an independent fifthwheel device in order to minimize inaccuracies introduced by such factors as variation in the rolling radius of vehicle tires. These points of careful workmanship also appear to have applicability to my invention, although some compromises may be made in favor of lower cost and easier operation, when laboratory precision is not required. In my invention power, P, can similarly be calculated from these measurements by the formula $P=KFS$, where K is a constant used to relate defined units to each other. For example, when it is desired to express P in units of Horsepower, when F is expressed in Pounds and S is expressed in Miles per Hour then $K = 0.002667$. It should be noted, however, that my invention provides these results while the vehicle remains in one place, without the need for expensive test roadways. These and other observations, thoughts, and calculations, including multitudinous details necessary to a good, low-cost testing device but generally within the state of the mechanical and electrical arts, have formed the background of this invention.

The working of this invention will become more apparent to those skilled in the art by reference to the following description of preferred embodiments of this invention described with the aid of the accompanying drawings wherein.

Figure 1:
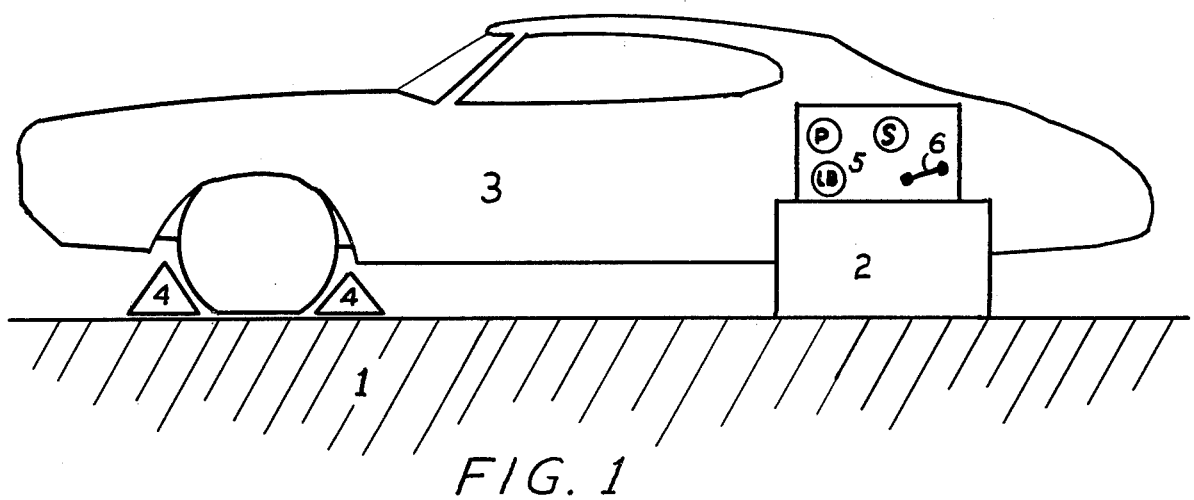
FIG. 1 is a generalized view of an automobile on the testing device.

Referring now to the drawings wherein like elements are indicated by like numerals, in FIG. 1, numeral 1 refers to the floor of the testing area, which supports the testing device, 2, and the front wheels of the vehicle being tested, 3. The front wheels of the vehicle, 3, are restrained by strong guards, 4, from motion, as an optional safety measure. The testing device, 2, is fitted with a readout panel, 5, and a control, 6, which may alternatively be mounted as shown, or remotely mounted, at the option of the user.

Figure 2:
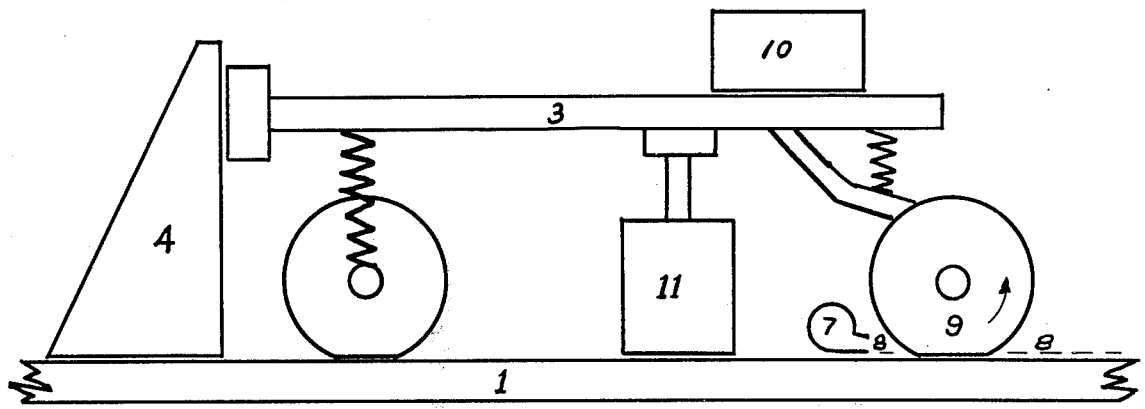
FIG. 2 is a schematic mechanical description of a simplified embodiment of the testing device.

Referring now to FIG. 2, wherein the floor, 1, is used to support all wheels of the vehicle. A nozzle, 7, places water, 8, between the floor, 1, and a vehicular driving wheel, 9. A strong safety guard, 4, attached to the floor, 1, restrains the motion of the vehicle, 3. In cases where the object of testing simply requires stationary exercising of the vehicle, this arrangement is sufficient. The weight of the vehicle, 3, acting on the interface of the wheel, 9, and the floor, 1, and influenced by the frictive characteristics of that interface, provides a horizontal force commonly called tractive effort, tending to propel the vehicle, 3, whch is restrained by the safety guard, 4. If it is desired to modify that tractive effort, additional weight 10, may be added to the vehicle, 3, or a portion of the weight of the vehicle, 3, may be lifted by the jack, 11. Increasing weight tends to increase tractive effort and decreasing weight tends to decrease tractive effort.

Figure 3:
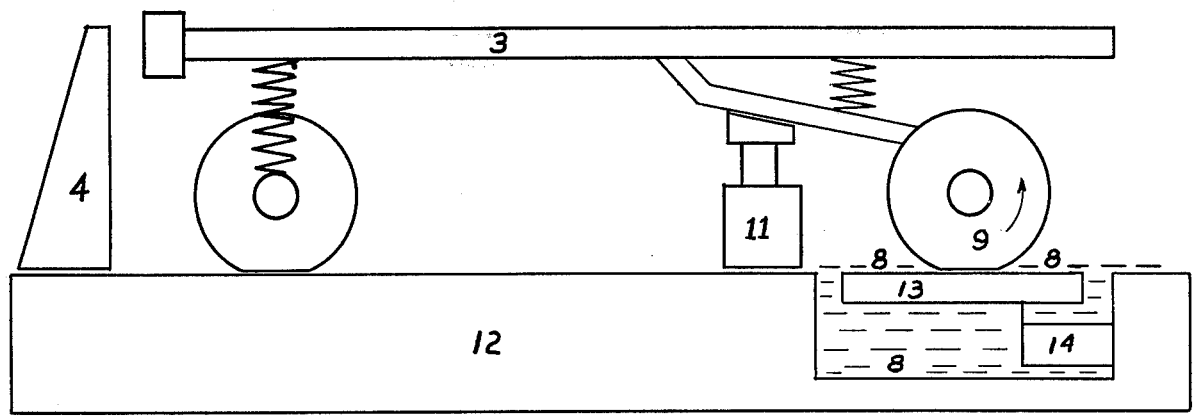
FIG. 3 is a schematic mechanical description of a preferred embodiment of the testing device.

Referring now to FIG. 3, a base structure, 12, is substituted for the floor, 1, of FIG. 2. A load-absorber plate, 13, mounted in the base structure, 12, is frictionlessly supported by the hydrostatic pressure of water, 8, and is restrained from horizontal motion by a straingage, 14. Leakage water, 8, lubricates and cools the interface between the load-absorber plate, 13, and the driving wheel, 9. The jack, 11, holds up the wheel, 9, and also restrains the forward motion of the vehicle, 3. Force at the interface of the wheel, 9, and the load-absorber, 13, and therefore the tractive effort of the vehicle, 3, is adjusted by changing the hydrostatic pressure of the water, 8, which acts on the lower surface area of the load-absorber, 13, providing adjustable vetical force, and adjustable tractive effort. The tractive effort is measured by the straingage, 14. The optional safety guard, 4, need not be in direct contact with the vehicle, 3.

Figure 4:
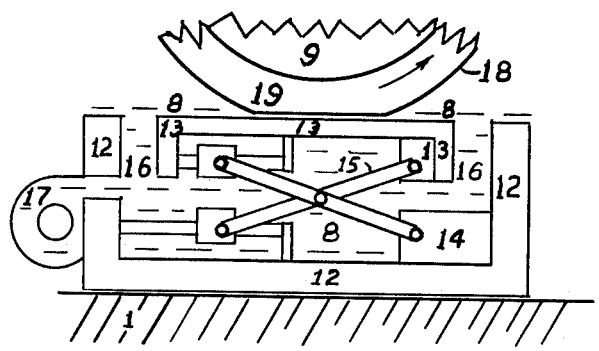
FIG. 4 is an internal sectional view of a load-absorber unit of a preferred embodiment of the testing device.

Referring now to FIG. 4, the load-absorber, 13, mounted in the base structure, 12, uses hydrostatic pressure of water, 8, supplied at a controlled pressure by pump, 17, or other appropriate means such as a control valve from a public water system, acting on its lower surface area, to support the vertical load provided by wheel, 9. Tipping moments are resisted by the scissors linkage, 15, which transmits the horizontal force or tractive effort to the straingage, 14. Leakage water, 8, which is regulated by such means as the clearance space between parts (here exaggerated for illustrative purposes) such as clearance, 16, between the base structure, 12, and the load-absorber, 13, cools and lubricates the interface between the load-absorber, 13, and the tread surface, 18, of the tire, 19, of the driving wheel, 9.

Figure 5:
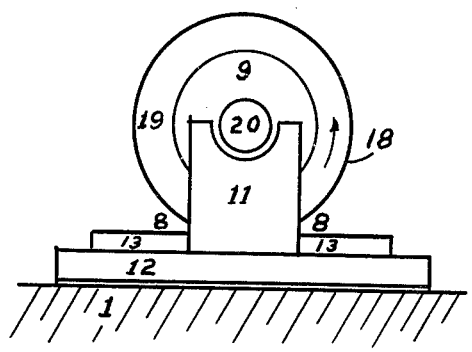
FIG. 5 is a cross-sectional view of a portion of a preferred embodiment of the testing device, illustrating a means for restraining the driving axle of an automobile being tested and the general positioning of a driving tire with respect to a load-absorber unit.

Referring now to FIG. 5, the jack, 11, mounted on a portion of the base structure, 12, cradles the housing of the driving axle, 20, restraining both vertical and horizontal motion of the axle, 20, thereby restraining the motion of the vehicle, 3. The power-absorber, 13, mounted in the base structure, 12, is forced by hydrostatic pressure on its lower surface to engage the tread, 18, of the tire, 19, of the driving wheel, 9, in slidable contact. Leakage water, 8, cools and lubricates this sliding interface. Suitable splash deflectors, spray guards, and drains are installed to direct and control this water, 8.

Figure 6:
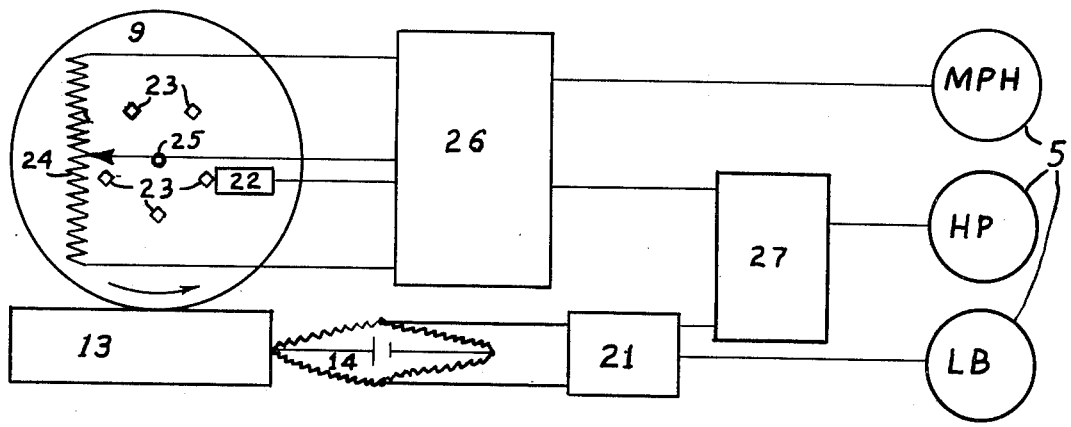
FIG. 6 is an electrical schematic of the measurement, computational, and display instrumentation of a preferred embodiment of the testing device.

Referring now to FIG. 6, the wheel, 9, exerts tractive effort against the power-absorber, 13, which exerts force against the straingage, 14. The straingage, 14, provides an electrical signal proportional to tractive effort. This tractive effort signal is fed to an integrated electronic circuit, 21, which provides current to drive a suitable meter showing tractive effort, pounds, in the display, 5, and also furnishes output for further processing. A magnetic pickup, 22, is placed adjacent to the lug bolts, 23, of the driving wheel, 9, providing a sensing means for the rotational speed of the driving wheel, 9. A linear potentiometer, 24, is mounted so its wiper arm can indicate the centerpoint, 25, of the driving axle, 20, and provide an appropriate electrical signal that represents the rolling radius of the wheel, 9. The electrical signals from the magnetic pickup, 22, and the potentiometer, 24, are fed to an integrated electronic circuit, 26, such as the ITT Semiconductor Type SAY115, which provides current to drive a meter on the display panel, 5, giving speed in miles per hour, and also provides an analog electrical output to integrated electronic circuit, 27. The output of integrated electronic circuit, 21, is also provided to integrated electronic circuit, 27, which multiplies its inputs, conditions the product, and provides current to drive a meter on the display panel, 5, giving vehicular traction power as horsepower, and an analog signal for remote use.

Figure 7:
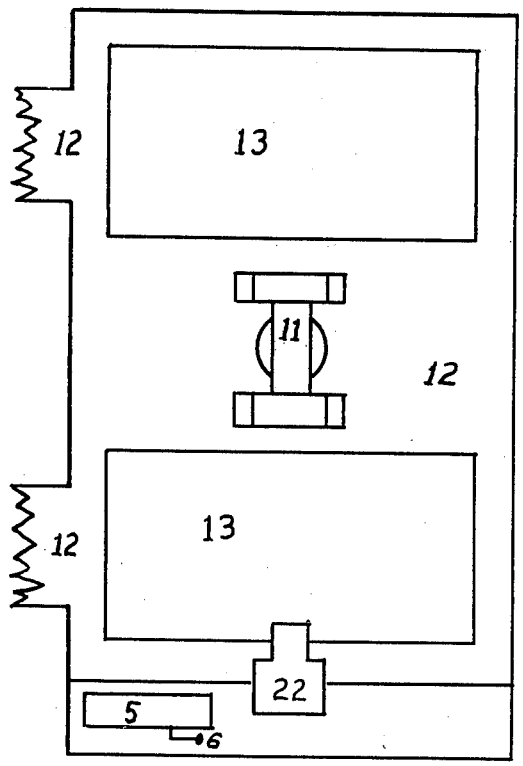
FIG. 7 is a general plan-view layout of a preferred embodiment of the testing device.

Referring now to FIG. 7, the jack, 11, is shown mounted on the base structure, 12, in such a manner that it may hoist driving axle, 20, with a yoke on both sides of its differential carrier. Two load-absorbers, 13, are located so as to accept the two driving wheels, 9, of the driving axle, 20. Optional ramp extensions for the front wheels of the vehicle, 3, are shown as portions of the base structure, 12. Magnetic pickup, 22, is adjustably mounted to accommodate the dimensions and location of driving wheel, 9. Display panel, 5, and control, 6, are shown in their optional mounting location.

Figure 8:
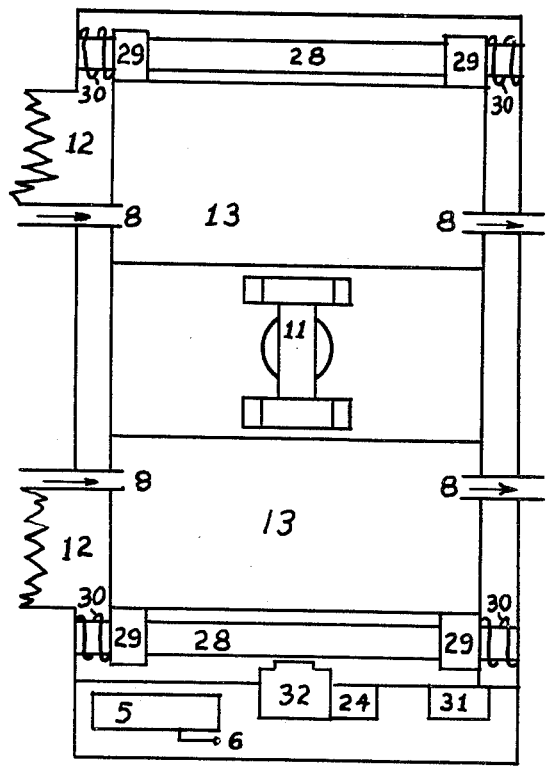
FIG. 8 is a general plan-view layout of an alternative preferred embodiment of the testing device.

Referring now to FIG. 8 the base structure, 12, with its associated optional ramp extensions, support the jack, 11, mounted to engage optionally either the driving axle, 20, or the frame of the vehicle, 3. The base structure, 12, also supports smooth round steel bars, 28, which carry linear ball bearings, 29, resiliently retained by coil springs, 30. These linear ball bearings, 29, support load-absorbers, 13, that are flooded with water, 8. The location of these resiliently-mounted load-absorbers, 13, is sensed with a linear potentiometer, 31, which provides a signal proportional to tractive effort. A DC tachometer generator, 32, adjustably mounted with a linear potentiometer, 24, senses the speed and rolling radius of a driving wheel, 9. Electronic processing provides appropriate signals for traction force, speed, and power to the readout meters on the display panel, 5. A control, 6, is provided to adjust load by adjusting the height of the jack, 11.

These preferred embodiments use several measurement, computational, and display techniques by way of illustration. Other techniques are applicable, are known in the art, and are not excluded here. For example, tractive effort force may be measured by such means as resistance or semiconductor straingages, poteniometrically sensed resilient gages, variable differetial transformer sensed resilient gages, magnetostrictive, reluctance, capacitive, hydrostatic, or fluidic gages. Similarly there are many suitable means for sensing speed, including conventional speedometry connected to the vehicular drive train, sensors at the wheel studs or hub using magnetic, electrical, optical, mechanical, or fluidic inputs (using or avoiding the use of wheel attachment fixtures) such as the well-known rotational DC tachometer generator connected to a rolling-radius sensing potentiometer and the newer light-emitting and photosensitive semiconductors in appropriate configurations. Speed sensing at the tire tread location, such as hydrostatic ram pressure or sonic detector systems may also be used. Although electronic computation is preferred, there are many suitable computation means. Mechanical, hydraulic, and fluidic computation means are applicable.

These preferred embodiments are arranged to accommodate automobiles with one driving axle, either rear-wheel or front-wheel drive. They can be loaded and unloaded from one end, as is customary in a smaller shop. With optional additions and rearrangement, vehicles may drive in from one end and drive out the other end in a throughflow traffic pattern. With simple optional additions and modifications they are adaptable to heavier vehicles and vehicles with more than one driving axle.

In a general manner, while there have been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:
1. A testing device for wheeled automotive vehicles comprising:
    first support means for engaging and restraining nonrotating elements of a vehicle, such as axle, nondriving wheel, and frame members;
    nonrotating second support means for slidably engaging the tread surface of said vehicle's driving tires;
    means for interposing a fluid between said second support means and said tires;
    means for measuring force between said first and second support means.

2. The invention of claim 1 wherein means are provided for moving said first and second support means relative to each other, providing a means for adjusting said vehicle's tractive force.

3. The invention of claim 1 wherein means are provided for:
    measuring speed of said vehicle's driving wheels;
    computing power from said meausements of force and speed;
    displaying the measured and computed values of testing results, such as force, speed, and power.

4. The invention of claim 3 wherein said speed measurement means comprises sensors that electrically measure wheel rotational velocity and rolling radius, electrically combining them into a vehicle speed measurement, such as the combination of a tachometer, potentiometer, and electronic multiplier circuit.

5. The invention of claim 3 wherein said speed measurement comprises a sonic apparatus.

6. The invention is claim 1 wherein said force measurement means is an electrically-sensed resilient gage such as a resistance strain gage.

7. The invention of claim 1 wherein said force measurement means is a fluidically-sensed apparatus such as a hydrostatic gage.

8. A testing device for wheeled automotive vehicles comprising: nonrotating support means for vehicular driving wheels;
    means for interposing fluid between said support means and said vehicular driving wheels;
    means for restraining vehicular horizontal motion, said means being horizontally connectable to said nonrotating support means;
    means for adjusting the forces between said nonrotating support means and said vehicle driving wheels, thereby adjusting the propulsive load applied to said vehicular driving wheels.

9. The invention of claim 8 wherein said adjusting means comprise means for providing relative movement between said vehicle and said support means.

10. The invention of claim 8 wherein said adjusting means comprise means for varying the pressure of said fluid.

11. A testing device of wheeled automotive vehicles comprising:
    nonrotating support means for vehicular driving wheels;
    means for interposing fluid between said support means and said vehicular driving wheels;
    means for restraining vehicular horizontal motion, said means being horizontally connectable to said nonrotating support means;
    means for measuring the horizontal force required to restrain vehicular motion.

12. The invention of claim 11 wherein means are provided for measuring the speed of said vehicular driving wheels, and computing power from said measurements of vehicular driving wheel speed and horizontal force.

13. The invention of claim 12 wherein means are provided for displaying the measured and computed values of test results, such as speed, tractive force, and power.

14. The invention of claim 12 wherein said speed measurement means comprises sensors that electrically measure wheel rotational velocity and rolling radius, electrically combining them into a vehicle speed measurement, such as the combination of a tachometer, potentiometer, and electronic multiplier circuit.

15. The invention of claim 11 wherein said speed measurement means comprises a sonic apparatus.

16. The invention of claim 11 wherein said force measurement means is an electrically-sensed resilient gage such as a resistance strain gage.

17. The invention of claim 11 wherein said force measurement means is a fluidically-sensed apparatus such as a hydrostatic gage.

* * * * *